US009507035B2

(12) United States Patent
Ryan et al.

(10) Patent No.: US 9,507,035 B2
(45) Date of Patent: Nov. 29, 2016

(54) TRI-MATERIAL DUAL-SPECIES NEUTRON/GAMMA SPECTROMETER

(71) Applicant: University of New Hampshire, Durham, NH (US)

(72) Inventors: James M. Ryan, Lee, NH (US); Jason Scott Legere, Sanford, ME (US); Peter F. Bloser, Portsmouth, NH (US)

(73) Assignee: University of New Hampshire, Durham, NH (US)

( * ) Notice: Subject to any disclaimer, the term of this patent is extended or adjusted under 35 U.S.C. 154(b) by 0 days.

(21) Appl. No.: 14/209,054

(22) Filed: Mar. 13, 2014

(65) Prior Publication Data

US 2016/0313453 A1    Oct. 27, 2016

Related U.S. Application Data

(63) Continuation-in-part of application No. 13/373,026, filed on Nov. 2, 2011, now Pat. No. 8,710,450.

(60) Provisional application No. 61/409,779, filed on Nov. 3, 2010.

(51) Int. Cl.
*G01T 3/06* (2006.01)
*G01T 1/20* (2006.01)

(52) U.S. Cl.
CPC . *G01T 3/06* (2013.01); *G01T 1/20* (2013.01); *G01T 1/2008* (2013.01)

(58) Field of Classification Search
CPC .......... G01T 1/2008; G01T 3/06; G01T 1/20
USPC ...................................... 250/390.11
See application file for complete search history.

(56) References Cited

U.S. PATENT DOCUMENTS

| 3,832,545 A | 8/1974 | Bartko |
| 4,415,808 A | 11/1983 | Cusano et al. |

(Continued)

FOREIGN PATENT DOCUMENTS

| JP | S486831 | 2/1973 |
| JP | S6249282 A | 3/1987 |
| JP | 05341047 A | * 12/1993 |
| JP | 2008-026195 | 2/2008 |
| JP | 2008-045948 | 2/2008 |

OTHER PUBLICATIONS

JP H5-341047, machine translation.*

(Continued)

*Primary Examiner* — Marcus Taningco
*Assistant Examiner* — Gisselle Gutierrez
(74) *Attorney, Agent, or Firm* — Finch & Maloney PLLC

(57) ABSTRACT

A system of the present invention is capable of detecting, imaging and measuring both neutrons and gamma rays. In some cases, the system has a plurality of parallel plates each containing a plurality of detectors. The plates comprise non-PSD organic scintillation detectors, scintillation detectors having pulse-shape discrimination (PSD) properties, and inorganic scintillation detectors. In some other cases, the system has a plurality of scintillation rods radially distributed about a central axis, and the scintillation rods comprise non-PSD organic scintillation detectors, scintillation detectors having pulse-shape discrimination (PSD) properties, and inorganic scintillation detectors. A first plate or rod and a second plate or rod are used in connection to detect, image and measure neutrons and/or gamma rays.

20 Claims, 7 Drawing Sheets

(56) References Cited

U.S. PATENT DOCUMENTS

| | | | |
|---|---|---|---|
| 5,446,288 A * | 8/1995 | Tumer | G01N 23/204 250/390.05 |
| 7,741,613 B1 * | 6/2010 | Mascarenhas et al. | 250/390.11 |
| 7,772,558 B1 | 8/2010 | Nagarkar et al. | |
| 2004/0251420 A1 | 12/2004 | Sun | |
| 2007/0272874 A1 | 11/2007 | Grodzins | |
| 2008/0001096 A1 | 1/2008 | Smither | |
| 2008/0315109 A1 | 12/2008 | Stephan et al. | |
| 2009/0250620 A1 * | 10/2009 | Rvan et al. | 250/370.09 |
| 2010/0006769 A1 | 1/2010 | Kraft et al. | |
| 2010/0067001 A1 | 3/2010 | Corbeil et al. | |
| 2010/0252741 A1 | 10/2010 | Zaitseva et al. | |
| 2013/0193331 A1 * | 8/2013 | Perna | G01T 1/2002 250/366 |

OTHER PUBLICATIONS

Nishitani et al., "Development of Neutron Detector with the Digital Signal Processing Technique," Eleventh Meeting of the ITPA Topical Group on Diagnostics, Sep. 8, 2006, pp. 1-17.

Partial Supplementary European Search Report, received in European Patent Application No. 1183854.6, dated Jul. 6, 2015, 7 pages.

Extended European Search Report, received in European Patent Application No. 1183854.6, dated Oct. 23, 2015, 10 pages.

Office Action received in Japanese Patent Application No. 2013-537655, mail date Jun. 30, 2015, 3 pages.

Madden et al., "An Imaging Neutron/Gamma-Ray Spectrometer," Proc. SPIE 8710, Chemical, Biological, Radiological, Nuclear, and Explosives (CBRNE) Sensing XIV, 87101L, May 29, 2013, 14 pages.

Madden et al., "An Imaging Neutron/Gamma-Ray Spectrometer," Proc. SPIE 8710, Chemical, Biological, Radiological, Nuclear, and Explosives (CBRNE) Sensing XIV, 87101L, May 29, 2013, 13 pages.

Ryan et al., "An Imaging Neutron/Gamma-Ray Spectrometer," Proc. SPIE 8509, Penetrating Radiation Systems Applications XIII, 850905, Oct. 19, 2012, 13 pages.

Ryan, James, "NSPECT—A Portable Imaging Neutron Spectrometer," Univ. of New Hampshire, 2011, 1 page.

* cited by examiner

Top view

Side view with
outer cylindrical housing
removed

TRI-MATERIAL DUAL-SPECIES NEUTRON/GAMMA SPECTROMETER

CROSS-REFERENCE TO RELATED APPLICATIONS

The present application is a continuation-in-part of U.S. patent application Ser. No. 13/373,026 filed on Nov. 2, 2011, which claims the benefit of U.S. Provisional Patent Application 61/409,779 filed on Nov. 3, 2010, each of which are incorporated herein by reference.

STATEMENT REGARDING FEDERALLY SPONSORED RESEARCH OR DEVELOPMENT

This invention was made with government support under Defense Threat Reduction Center contracts HDTRA1-08-C-0077, HDTRA1-07-P-0240, and HDTRA-11-C-0054. The government has certain rights in the invention.

FIELD OF THE INVENTION

This invention relates to an imaging neutron and gamma spectrometer and, in particular, a spectrometer for real-time neutron and gamma source location and identification.

BACKGROUND OF THE INVENTION

There are several applications for conventional neutron imager/spectrometers. However, all applications revolve around detecting, locating, monitoring, and identifying nuclear material. Neutrons are, by their nature, resistant to detection, and defy easy imaging and spectroscopy. Detection has mostly been in the form of registering moderated or thermalized neutrons from a fast neutron source. Because one only measures the charged particles produced by a neutron interaction, deducing the properties of the parent neutron is ambiguous, besides being difficult.

Registering moderated neutrons comes without any information about the incident direction or energy. Measuring fast neutrons in a bulk detector provides a compromised energy measurement, but still lacks directional information. A double-scatter telescope pays the penalties of greatly increased complexity and low efficiency by requiring two neutron scatters, but it benefits in the end because the elastic scatter kinematics can be used to constrain the incident velocity vector while simultaneously performing a quality energy measurement. In the present invention, to perform imaging, an incident neutron undergoes a neutron-proton (n-p) scatter in each of two detectors. One must be able to follow the path of the neutron once it enters the instrument, measuring the location, relative time, and energy deposits of each n-p interaction. In the case of gamma rays, the same technique applies, but Compton-scatter electrons are used instead of protons.

SUMMARY OF THE INVENTION

The system of the present invention is capable of detecting, imaging, and measuring both neutrons and gamma rays. In certain embodiments, the system has a plurality of parallel plates each containing a plurality of detectors. Each plate may have the same or different collection of detectors. In certain embodiments, the system has a plurality of scintillation rods of uniform diameter and length that are radially distributed about a central axis. In certain embodiments, the first plate or rod and/or the second plate or rod may use non-PSD organic scintillation detectors. In certain embodiments, the first plate or rod and/or second plate or rod may use scintillation detectors having pulse-shape discrimination (PSD) properties. In certain embodiments, the first plate or rod and/or the second plate or rod may use inorganic scintillation detectors. In certain embodiments, a first plate or rod and a second plate or rod are used in concert to detect, image, and measure neutrons and/or gammas.

One aspect of the present invention is a system for imaging and measuring neutrons and gamma rays, the system comprising a frame; a plurality of plates, having at least a first plate and a second plate, which plates are parallel to each other and carried by the frame; an electronic and processing unit; the first plate and the second plate each carrying a plurality of detectors, wherein the detectors are electronically connected to the electronic and processing unit; and the detectors are non-PSD organic scintillators, inorganic scintillators, and scintillators that possess PSD properties, wherein the detectors detect a neutron and/or a gamma ray and the electronic and processing unit determines the path of the neutron and/or gamma ray based on an interaction with one of the detectors of the first plate and an interaction with one of the detectors of the second plate.

One embodiment of the system for imaging and measuring neutrons and gamma rays is wherein the inorganic scintillators use NaI. One embodiment of the system for imaging and measuring neutrons and gamma rays is wherein the non-PSD organic scintillators are plastic. One embodiment of the system for imaging and measuring neutrons and gamma rays is wherein the scintillators that possess PSD properties use stilbene.

Another aspect of the present invention is a method of imaging and measuring neutrons and gamma rays comprising: providing a plurality of plates, having at least a first plate and a second plate, with non-PSD organic scintillation detectors, inorganic scintillation detectors, and scintillation detectors that possess PSD properties; detecting a particle by its interaction with the non-PSD organic scintillation detectors of the first plate; measuring the time of flight of the particle from the non-PSD organic scintillation detectors of the first plate to the scintillation detectors that possess PSD properties detectors of the second plate; determining details regarding the particle based on interaction of the particle with the scintillation detectors that possess PSD properties detectors of the second plate, including the pulse shape generated by pulse-shape-discrimination (PSD) property of the detectors of the second plate; detecting the particle by its interaction with the inorganic scintillation detectors of the first plate; and analyzing data to determine if the particle is a neutron or a gamma ray.

One embodiment of the method of imaging and measuring neutrons and gamma rays further comprises maximizing the signal to noise for both the neutron and gamma ray detection based on the PSD measurement.

One embodiment of the method of imaging and measuring neutrons and gamma rays is wherein the inorganic scintillation detectors use NaI. One embodiment of the method of imaging and measuring neutrons and gamma rays is wherein the non-PSD organic scintillation detectors are plastic. One embodiment of the method of imaging and measuring neutrons and gamma rays is wherein the scintillation detectors that possess PSD properties use stilbene.

Another aspect of the present invention is a system for imaging and measuring neutrons and gamma rays, the system comprising an electronic and processing unit; a plurality of scintillation rods of uniform diameter and length that are radially distributed about a central axis, wherein the detectors are electronically connected to the electronic and processing unit and the detectors comprise non-PSD organic scintillators, inorganic scintillators and scintillators that possess PSD properties, wherein the detectors detect a neutron and the electronic and processing unit determines the path of the neutron based on an interaction with one of the detectors and then an interaction with one of the other detectors; and wherein the detectors detect a gamma ray and the electronic and processing unit determines the path of the gamma ray based on interaction with one of the detectors and then an interaction with one of the other detectors.

One embodiment of the system for imaging and measuring neutrons and gamma rays is wherein the non-PSD organic scintillators are non-liquid scintillators. One embodiment of the system for imaging and measuring neutrons and gamma rays is wherein the inorganic scintillators use NaI. One embodiment of the system for imaging and measuring neutrons and gamma rays is wherein the scintillators that possess PSD properties use stilbene.

Another aspect of the present invention is a method of imaging and measuring neutrons and gamma rays comprising: providing an electronic and processing unit; providing a plurality of scintillation rods of uniform diameter and length that are radially distributed about a central axis, wherein the detectors are electronically connected to the electronic and processing unit and the detectors compose non-PSD organic scintillators, inorganic scintillators and scintillators that possess PSD properties, detecting a particle by its interaction with the non-PSD organic scintillators; measuring the time of flight of the particle from the non-PSD scintillators to the scintillators that possess PSD properties; determining details regarding the particle based on interaction of the particle with the scintillators that possess PSD properties, including the pulse shape generated by pulse-shape-discrimination (PSD) property of the scintillators; detecting the particle by its interaction with the inorganic scintillators; and analyzing data to determine if the particle is a neutron or a gamma ray.

One embodiment of the method of imaging and measuring neutrons and gamma rays further comprises maximizing the signal to noise for both the neutron and gamma ray detection based on the PSD measurement.

One embodiment of the method of imaging and measuring neutrons and gamma rays is wherein the inorganic scintillators use NaI. One embodiment of the method of imaging and measuring neutrons and gamma rays is wherein the non-PSD organic scintillators are plastic. One embodiment of the method of imaging and measuring neutrons and gamma rays is wherein the scintillators that possess PSD properties use stilbene.

One embodiment of the method of imaging and measuring neutrons and gamma rays is wherein the non-PSD organic scintillators, inorganic scintillators and scintillators that possess PSD properties are grouped in trios.

These aspects of the invention are not meant to be exclusive and other features, aspects, and advantages of the present invention will be readily apparent to those of ordinary skill in the art when read in conjunction with the following description, appended claims and accompanying drawings.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1A:
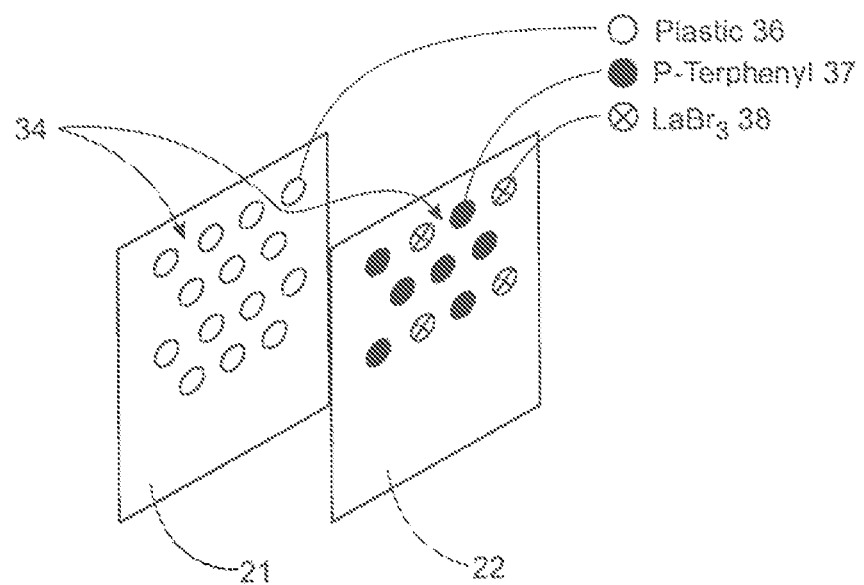
FIG. 1A is a schematic view of one embodiment of an imaging neutron/gamma spectrometer system.

Referring to FIG. 1A, an imaging neutron/gamma spectrometer is shown. The system is capable of imaging and measuring both neutron and gamma sources remotely. Remotely imaging and measuring in the present system is done without touching the source. More particularly, one embodiment of the spectrometer of the present invention has a frame, not shown, and two parallel detecting plates or planes 21 and 22, and an electronic and processing unit, not shown. One of the preferred embodiments of the system is designed to be portable as described below in more detail.

In certain embodiments of the present invention, the detecting plates or planes 21 and 22 are parallel to each other. Each panel has a plurality of detectors 34. Each detector 34 is a scintillation detector. A scintillation detector or counter 34 produces a flash of light (scintillation) in a fluorescent material by an ionizing radiation, which is detected and counted by a multiplier phototube or other light sensor and associated circuits in the electronic and processing unit. Each of the detecting plates 21 and 22 has detectors 34 which can be the same or different from those of the other plates.

It is understood that many forms of scintillators may be used in the neutron/gamma detector of the present invention. For simplicity, the examples listed herein may refer to three general forms of scintillators, including non-PSD organic scintillators, scintillators that possess PSD properties (organic or inorganic), and inorganic scintillators. In certain embodiments of the present invention the organic scintillators may include, but are not limited to plastic, liquid, or crystalline. In certain embodiments of the present invention the scintillators that possess PSD properties may include, but are not limited to organic scintillators. In certain embodiments of the present invention the scintillators that possess PSD properties may include, but are not limited to stilbene, p-Terphenyl, and/or other liquid scintillators. In certain embodiments of the present invention the inorganic scintillators may include, but are not limited to sodium iodide (NaI), bismuth germanate (BGO), lutetium-yttrium oxyorthosilicate (LYSO) which may be cerium-doped ($Lu_{1.8}Y_{0.2}SiO_5(Ce)$), gadolinium-yttrium oxyorthosilicate (GYSO), yttrium aluminum garnet which may be cerium-doped (YAG(Ce)), lanthanum bromide ($LaBr_3$) or other rare-earth halides. Many types of organic and inorganic scintillators could be utilized depending on the application, and cost, mass and size constraints.

In one embodiment of the present invention, the two plates 21 and 22 form a stack in which MeV-range nuclear neutron and gamma radiation can be detected. The detectors 34 of the first plate 21 and second plate 22 have a non-PSD organic scintillator that acts as part of the neutron imaging system and to a much lesser degree the gamma imaging system. The detectors 34 of the first plate 21 and the second plate 22 also employ a scintillator that possesses pulse-shape-discrimination (PSD) properties. In certain embodiments, neutrons are scattered first in the first plate 21 by the non-PSD organic scintillator detectors 34 and then further scattered in the second plate 22 by the detectors 34 that possesses pulse-shape-discrimination (PSD) properties in a double-scatter arrangement. The PSD signal from the scintillator is used preferentially to select either neutron interactions or gamma interactions.

In contrast to conventional two plate arrangements, the PSD-capable detectors 34 of the second plate 22 and non-PSD detectors 34 of the first plate 21, allow the system to be used also for gamma imaging. In certain embodiments of the present invention, the gamma imaging uses the second plate 22, with the detectors having PSD properties 34, and the first plate 21, where the detectors 34 of the first plate 21 and the second plate 22 have inorganic scintillators. In a preferred embodiment, the inorganic detectors use sodium iodide (NaI). In a preferred embodiment, the detectors having PSD properties use stilbene. In a preferred embodiment, the (non-PSD) organic detectors are scintillating plastic. Although an organic PSD scintillator such as stilbene can be used in both the first and second plates, plastic scintillator is less expensive and has certain advantages over stilbene in locations where PSD is not required.

In certain embodiments of the present invention, the second plate 22 or the first plate 21 comprise PSD-capable detectors. A key component of the gamma imaging system provides the necessary PSD measurement to maximize signal to noise for both detection systems. By having an array of various detectors in each plane, the detector can function in either direction for a variety of radiation sources. For example, in one embodiment of the present invention, the PSD-capable detectors 34 of the second plate 22 are shared by the gamma and neutron imaging systems. The stilbene, or other material with PSD properties, provides the neutron/gamma identification to maximize the signal to noise ratio for both systems. In certain embodiments, the system uses solid scintillators in contrast to liquid scintillators such as a mineral-oil based scintillator. Generally, the solid scintillators allow for a more rugged portable system.

As indicated above, the two parallel detecting plates 21 and 22 each have a plurality of detectors 34. The same style detectors 36, 37, and 38 are used throughout the plates. The order of detectors 36, 37, and 38 is not critical and they include, for example, non-PSD organic scintillators, scintillators having PSD properties (either organic or inorganic), and inorganic scintillators.

The actual neutron measurements employ the scintillation amplitude in the non-PSD organic scintillators and the time-of-flight from the non-PSD organic to the PSD-capable detectors. A gamma signal in the PSD-capable detector can be used to reject gamma events. The gamma measurements use the scintillation amplitude in both the PSD-capable detector and the inorganic scintillators with the time-of-flight used to reject neutrons. A neutron signal in the PSD-capable detectors would be required to accept an event. An event occurs when there is a signal in the two detecting planes.

As indicated above, the system is capable of measuring both neutrons and gamma rays. The neutron and gamma emissions are related and can be used together for increased knowledge of the source of radiation environment. The system is essentially a pair of double scatter cameras. The first plate 21 and/or the second plate 22 are the double scatter camera for the neutrons and gamma emissions. The second plate 22 and the first plate 21 are the double scatter camera for the gamma emissions and the neutrons from the other direction. Whether it be a neutron or a gamma, the idea is that a particle scatters once in a forward detector after which it sometimes scatters in a rearward detector. A neutron or a gamma can pass through any of these detectors 34 without any interaction. These particles interact in a probabilistic fashion. The thickness of these detectors is selected to be thick enough to register a reasonable fraction of particles, but not so thick that they interact twice.

The ideal scattering or detection medium for neutrons, the detectors 34 in the first plate 21 and the second plate 22, also happens to be an excellent forward scatterer for gamma rays. Such a material is an organic substance rich in hydrogen. Thus, for a neutron camera, one constructs the camera with an organic scintillator for both the forward and rearward scatterers. The neutron energy is measured by summing the energy the neutron deposits in the forward detector and the energy of the recoiling neutron measured by the travel time to the rearward detector.

The situation for gamma rays is different in that all gamma rays travel with the same speed, so that no energy information is gleaned from time-of-flight. Instead, one must capture the gamma ray in entirety, requiring a thick detector, typically made of a dense inorganic scintillator, such as is found in the detectors in the first plate 21 and second plate 22. The hydrogen content of a gamma-ray detector is not important. However, it must just be thicker than the interaction length of the gamma ray in that medium.

The preferred neutron scatter process starts with a scatter in an organic scintillator and then another scatter in a different organic scintillator. One of these scintillators should have PSD properties. The preferred gamma scatter process begins with a scatter in an organic scintillator, followed by a scatter in an inorganic scintillator. It is best if the organic scintillator has PSD properties. The physical arrangement of the organic (PSD and non-PSD) and the inorganic scintillators is not fixed. Even intermingling scintillator types is allowed, provided the scintillator signals are processed by the appropriate electronics. Scintillator arrangements need not be rectilinear or planar.

In certain embodiments, the neutron scatter camera of the system has a plurality of plates, having at least a first plate and a second plate with non-PSD organic scintillation detectors. In certain embodiments of the present invention, it is preferred for the gamma ray detection camera to have an inorganic scintillation detector 34. Either plate with the scintillator having PSD properties can serve as the rearward scatterer for the neutron camera and the forward scatterer for the gamma camera, thereby providing a dual species camera.

While a neutron camera comprised of all organic scintillation detectors can detect gamma rays, it is done with greatly compromised quality. Similarly, a traditional gamma camera can detect neutrons but inefficiently and with compromised resolution.

The detectors 34 in a preferred embodiment of the present invention use solid organics such as plastic and stilbene in the two plates instead of a liquid such as a mineral-oil based scintillator. This is because fieldwork requires added ruggedness. Another attribute is that of so-called pulse shape discrimination (PSD), meaning that the nanosecond shape of the signal from the detectors can be used to identify whether the scattering particle is a gamma ray or a neutron. It is very beneficial to have plates comprised of scintillation detectors with this property.

Certain embodiments of the system of the present invention are designed with some of the material in the detectors 34 of the first plane 21 and second plane 22 being plastic scintillators with no pulse shape discrimination properties. Certain embodiments of the system of the present invention are designed with some of the material in the detectors 34 of the first plane 21 and the second plane 22 being comprised of an organic crystal, called stilbene, or some other material that possesses pulse shape discrimination properties. Certain embodiments of the system of the present invention are designed with some of the material in the detectors 34 of the first plane 21 and the second plane 22 being comprised of an inorganic crystal, such as NaI, or the like, that does not possess PSD.

The complete system has optimized sensitivity for both species of particles, while minimizing the total amount of hardware and the electronics. In certain embodiments, having all scintillators in the solid state can make the detector rugged while still possessing excellent resolution and sensitivity for both species.

Neutrons have no charge, and therefore do not readily interact. Thus, neutrons must be detected by indirect methods. A preferred method for neutron detection at MeV energies exploits the large elastic n-p scattering cross section. The choice material, serving the functions of neutron scatterer and recoil proton detector, is an organic scintillator. This material consists of mainly hydrogen and carbon, in the stoichiometric number ratio of approximately 1.0 to 2.0. The relative concentration of hydrogen varies with scintillator type.

Other configurations and materials, while conforming to the spirit of the tri-materials detector described herein are envisioned. These materials and configurations allow for designing an instrument with severe cost constraints, severe space and mass constraints, specialized performance requirements, different energy ranges, different fields of view and other generalizations. In certain embodiments of the present invention, the configuration of the tri-materials design places the tri-materials in parallel planes, or orientation. The thrust of the design is to enable a technology that possesses optimized sensitivity for neutron and gamma detection, imaging and spectroscopy from a radioactive or fissile source. While adhering to the tri-materials, dual species concept, rate can generalize the mechanical design, allowing for the different sensor materials to be re-arranged, inverted or co-located. This flexibility of the mechanical design allows one to accommodate cost, volume and mass constraints and satisfy performance requirements.

For example, the D2 and D3 detector cells in two planes can be intermingled in a single plane, while keeping the D2 and D3 electronics separated. Although reducing collecting area from three to two planes, the instrument is compacted by 40% with a similar reduction in mass. Another possibility is to intermingle D1, D2 and D3 detector cells in two independent planes with similar distributions as described herein. The instrument then becomes one of tri-material, dual species and, most importantly, bi-directional at a cost of collecting area. Trade-off studies show that the concept is more marketable with greater utility for different users.

In certain embodiments, the material for D1 is nominally a plastic scintillator, but this could also be another organic scintillator, even one in liquid form. The material in D2 may also be organic, but has the property of being able to distinguish between gamma and neutron interactions within it. The current PSD-capable material is stilbene, but other materials are becoming available that can duplicate this function, for example, p-Terphenyl. Lastly, the D3 material could be bismuth germanate (BGO), NaI, or numerous other inorganic materials that are better than BGO, cheaper than BGO, faster than BGO, and the like.

Figure 1B:
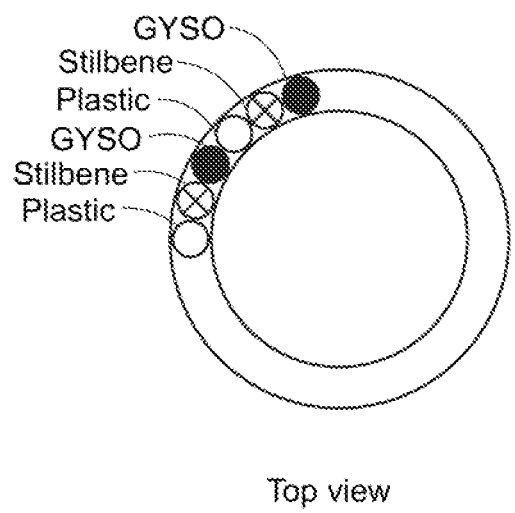
FIG. 1B is a schematic view of one embodiment of an imaging neutron/gamma spectrometer system.
Figure 1B:
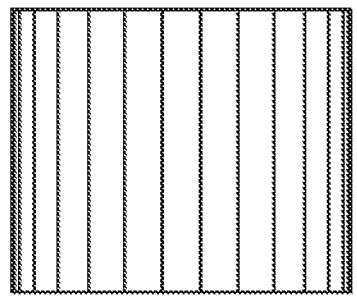

Referring to FIG. 1B, another embodiment of the present invention is shown. In certain embodiments, there are several scintillation rods all of the same diameter and/or length that are distributed radially around a central axis. In certain embodiments, the three detectors, D1, D2, and D3 are grouped in trios to provide optimized dual-species sensitivity. In certain embodiments, there may be other grouping or distributions to provide optimized detection in 360°.

To perform imaging, an incident neutron must undergo an n-p scatter each of two detectors. One must be able to follow the path of the neutron once it enters the instrument, measuring the location, relative time, and energy deposits of each n-p interaction. In the case of gamma rays, the same technique applies, but Compton-scatter electrons are used instead of protons.

Figure 2:
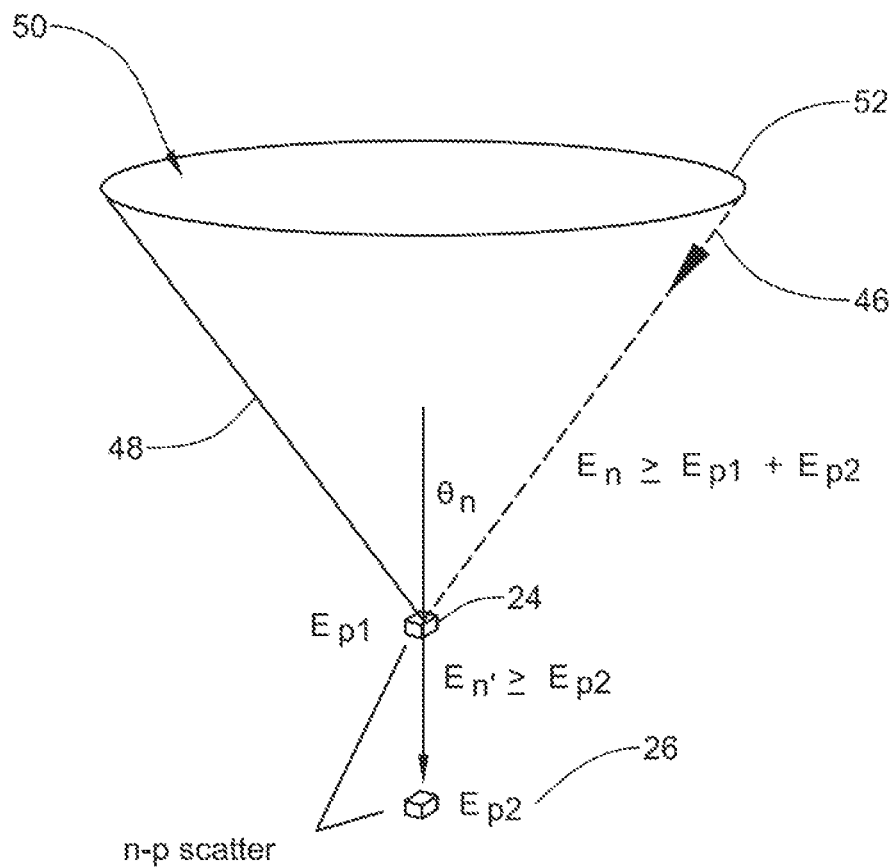
FIG. 2 is a schematic view of neutron double-scatter kinematics.

Referring to FIG. 2, a schematic view of neutron double-scatter kinematics is shown. A neutron 46, whose incident direction is unknown, undergoes two n-p scatters by detection by detectors 34, such as shown in FIG. 1A and FIG. 1B, to obtain information regarding the source. By measuring the spatial coordinates of the two interactions and time of flight (ToF), the energy and direction (i.e., momentum vector) of the scattered neutron is determined. By measuring the energy of the first recoil proton, the energy of the incident neutron as well as the scatter angle can be computed.

With respect to embodiments using scintillation rods or bars that are radially distributed about a central axis, scintillator bar material and diameter are chosen to maximize the probability of single n-p scatters occurring within one scintillator bar, with the scattered charged particle being fully contained within the boundaries of the scintillator bar. At the same time, the scintillator bars should be sufficiently thin for a scattered neutron to exit the bar after the first n-p scatter and to produce successive n-p scatters in other scintillator bars.

Energy information on a recoil proton, or Compton electron in the case of gamma rays, resulting from an elastic n-p scatter in a given scintillator bar or rod, is obtained from the amplitude of the signals measured by the PMTs at the first and second ends of the scintillator bar. Position information on the proton in the x-y plane is determined from the position in the x-y plane of the scintillator bar in which the interaction occurs. Position information on the proton along the z-axis is measured by analyzing the arrival time differences and/or the amplitude differences of signals measured by PMTs at the ends of the scintillator bar in which the interaction occurs. The signals measured by the PMTs at the ends of the scintillator bars in which successive n-p scatters occur also provide a measure of the relative times of the successive scatters. With this information one can constrain the incident neutron direction to lie on the mantle 48 of a cone 50 about the recoil neutron velocity (as seen in FIG. 2). The scatter angle $\sin^2 \theta = E_p/E_n$. By projecting the cone 50 onto an object plane or sphere, one has an event circle 52 for each event, also shown in FIG. 2. From the intersection of multiple event circles, through statistical means it is possible to obtain an image of a neutron source.

Still referring to FIG. 2, in a preferred embodiment the detectors 34 in the first plate 21 are made up of 1 inch cylindrical cells of plastic scintillator, read out by fast, rugged 1 inch photo multiple tubes (PMT). The detectors on the second layer are likewise made up of 1 inch cells read out by similar PMTs. In certain embodiments, the first plate 21 and the second plate 22 are made up of plastic scintillators, stilbene, and inorganic scintillators such as sodium iodide (NaI). The detectors 34 are capable of pulse-shape-discrimination (PSD). Pulse shape discrimination (and Time-of-Flight (ToF)) allows the system to reject or distinguish gamma rays, important for high background environments.

Figure 6:
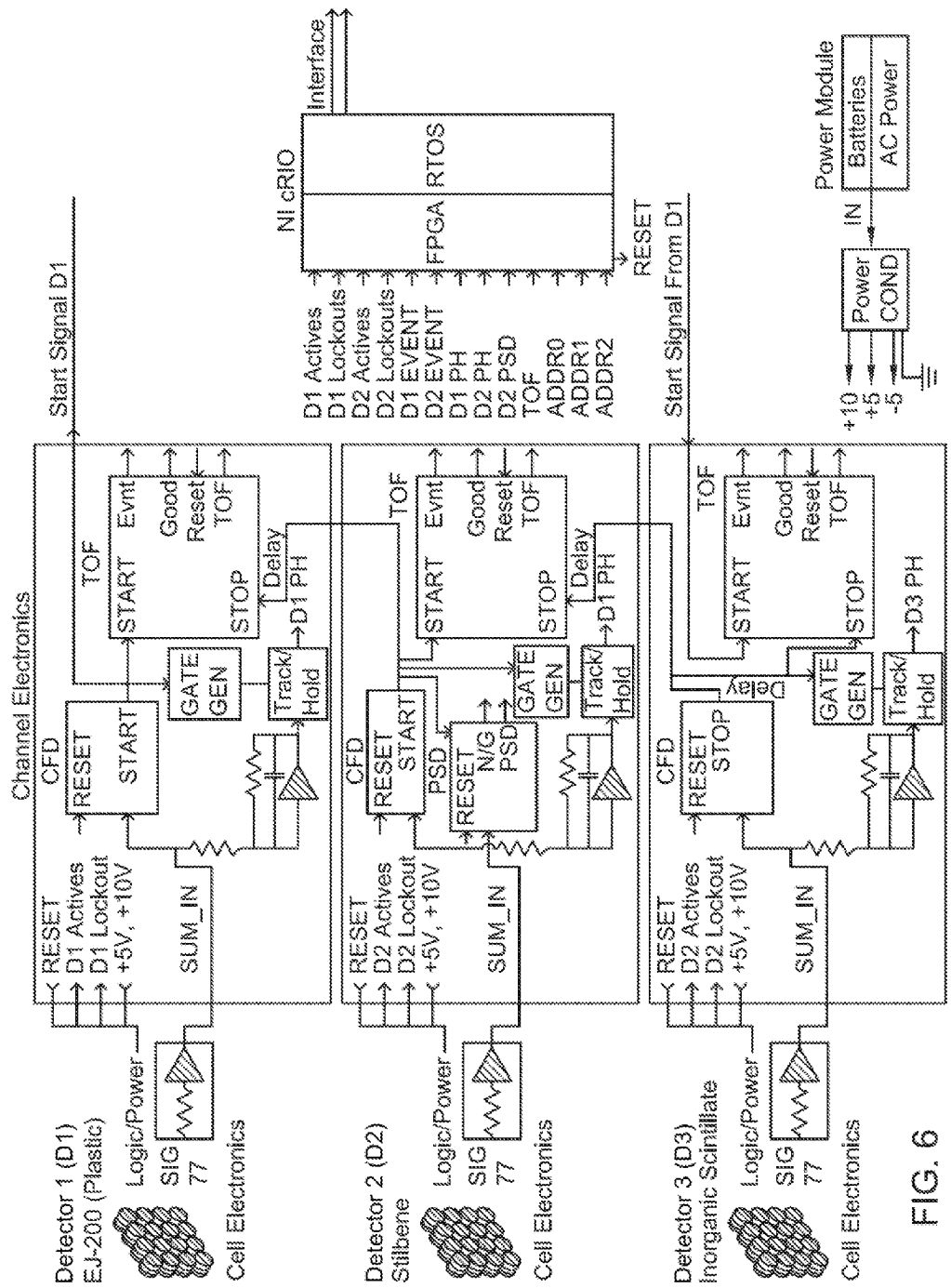
FIG. 6 is a block diagram of the three-detector system for detecting neutron and/or gamma radiation.

With some of the underlying theory described, the method of detection, as shown in the block diagram of FIG. 6, is described. Time-of-flight measurements are made between plates 21 and 22. All cells or detectors 34 represent independent data channels. When a neutron interacts with a detector 34 in the first plate 21 analog signals from that detector plate are generated from the analog sum of the different cells in first plate 21. Those signals initiate the ToF measurement, create a fast logic signal to test for time coincidence with what happens in the second plate 22, and serve as an analog pulse height for the energy deposited by the neutron in the first plate 21. The cell identification is taken to be the interaction location, i.e., a spatial resolution of 1 inch corresponding to a particular detector. Multiple signals from different detectors 34 in the first plate 21 are rejected. Similar signal processing takes place in the second plate 22, where the sum signal stops the ToF measurement and the cells that trigger are identified and recorded.

The stilbene detectors, a PSD-capable organic scintillator, of the second plate 22 possess pulse-shape-discrimination properties. This property of the scintillator produces analog signals that can be used to identify whether the ionizing particle is either fast (electron, muon) or slow (proton or heavy ion). The two types of particles differ in their detailed pulse shape—a function of the chemistry of the scintillator. Neutron-initiated events can thus be identified and selected fur further data analysis. Electron ionization pulse shapes are generally discarded.

In a preferred embodiment, the two plates 21 and 22 are separated by 30 cm, scintillator to scintillator. A gamma ray over this distance registers a 1 ns ToF, while a 1-MeV neutron requires ~30 ns to cover the same distance. Oblique trajectories yield longer ToF values, but this effect is corrected with the event location information provided by the cell identifications. The ToF range is of order 50 ns, extending above and below typical fast neutron speeds. By having a longer ToF range, one automatically obtains a measure of the accidental coincidence rate—an important measurement in intense radiation environments.

As indicated above, one embodiment of the system is designed to be portable. In certain embodiments, the system is designed to operate eight hours on battery power with each plate populated with several detector cells. Analog data are processed in an on-board computer, which is part of the electronic and processing unit, digitized and formatted for transmission to a remote computer for real-time monitoring or analysis and/or data archiving. The connection between the on-board and remote computers can be by ethernet cable, wireless communications, or the like.

The instrument can be controlled through the remote computer, nominally a laptop computer running LabVIEW™ marketed by National Instruments. The remote computer also monitors many housekeeping parameters, such as temperature, voltages, count rates in all detector cells and other rates, important for assessing instrument behavior and performance. Gains in the photo multiple tubes (PMTs) are commandable. In certain embodiments, the detector cell plates are sprung to absorb shock during transit.

A prototype of the system was built with three cells in each plate. A test of the system to measure neutrons with the first plate 21 and the second plate 22 was also (1) a test of the performance on the electronics for each plate simultaneously to process signals from multiple cells and (2) a test of the ability to trim the gains and thresholds of six cells, so that they acted like a single instrument with minimal dispersion in the spectrum and image because of gain and threshold variations. For the exercise, a $^{252}$Cf source was placed on axis at a distance of 3.4 m.

Figure 3:
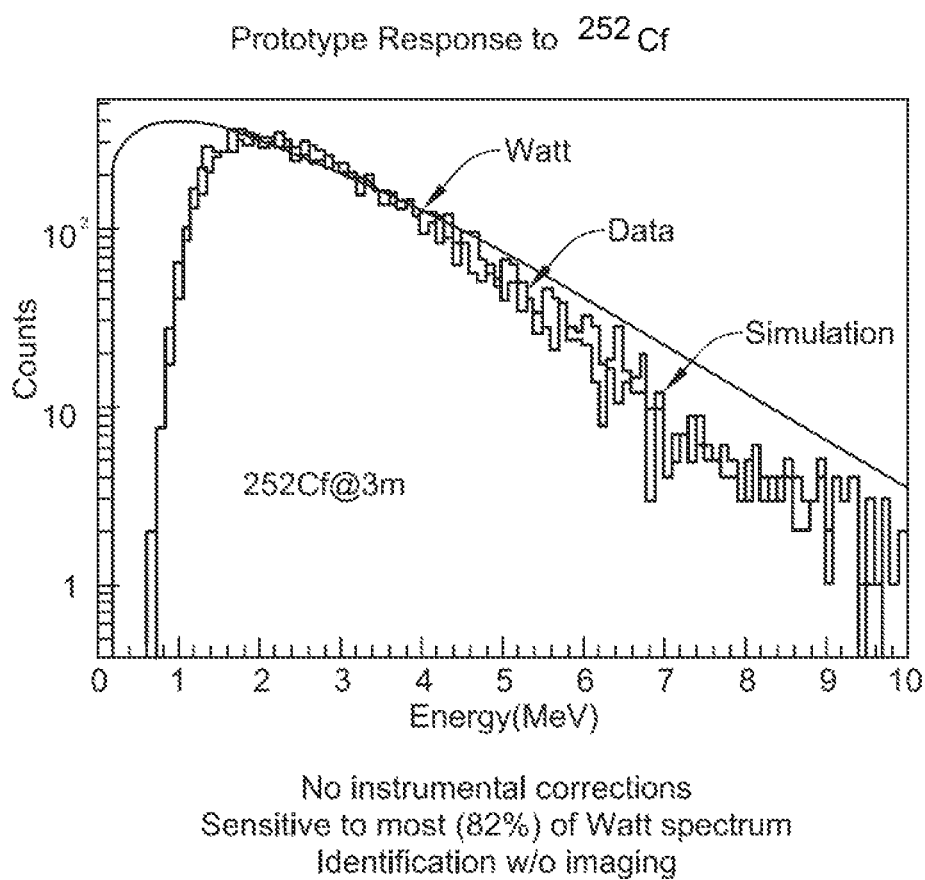
FIG. 3 is a graph of system response to $^{252}$Cf (Californium)
Figure 4:
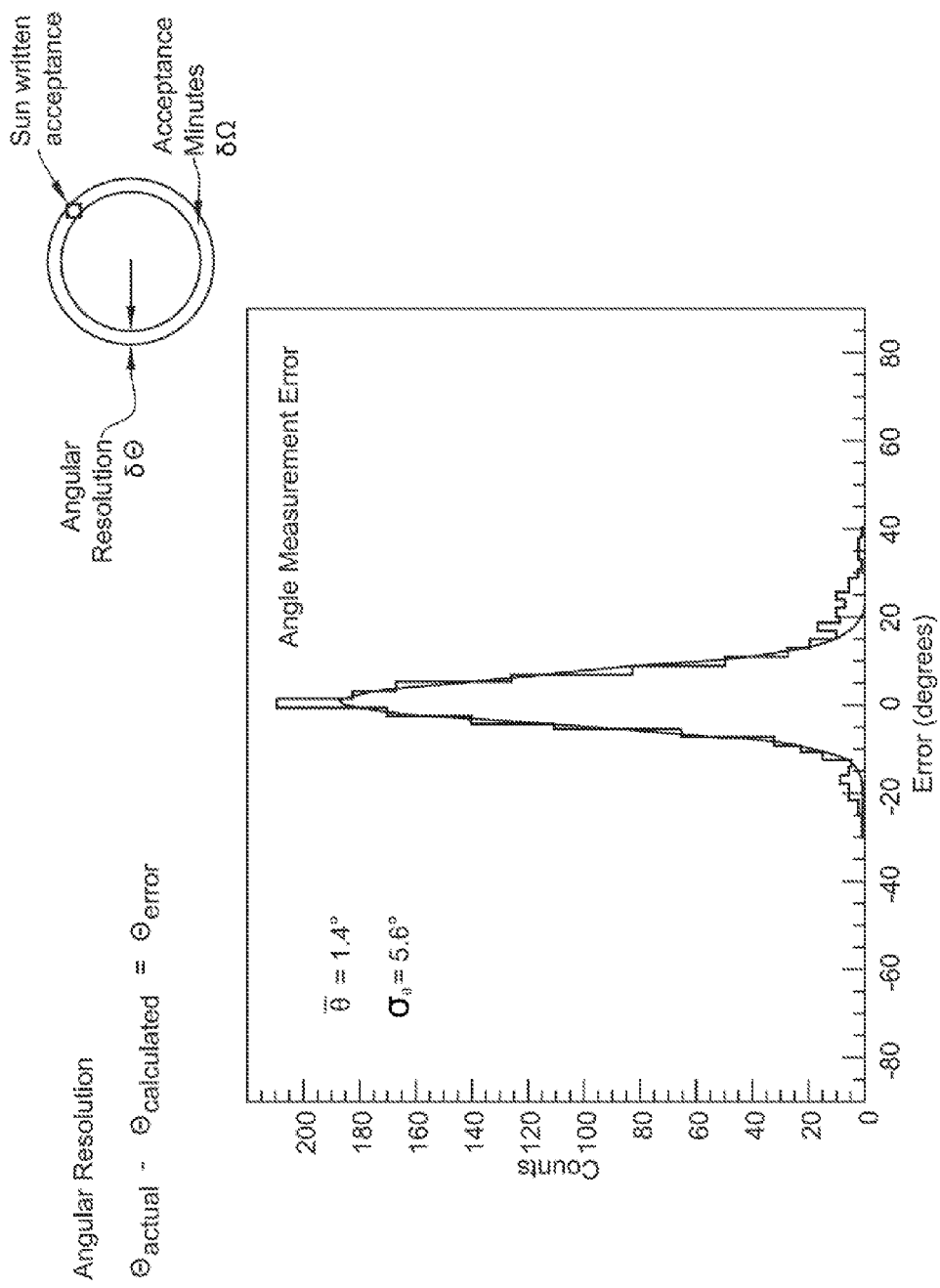
FIG. 4 is a graph of angular resolution.

Referring to FIG. 3, a graph of system response to $^{252}$Cf (Californium) is shown. A graph of angular resolution is shown in FIG. 4 and particularly an angular resolution measurement (ARM) for a 3×3 cumulative combination is shown. The neutron trajectory for each combination of cells is different and each kinematically measured scattered angle must agree with the scatter angle measured by simple geometry. The ARM function is the difference of those two angles per neutron event. The width of this distribution is ~12° (FWHM), somewhat larger than that measured with only two cells (10° FWHM). This is probably due to small variations in the gains of the detectors 34 in the first plate 21 or the time-of flight (ToF) calibrations. The non-gaussian wings on the ARM distribution arise from neutron events near the threshold of detection, i.e., 50 keV$_{ee}$ in either the first plate 21 or the second plate 22, as seen in FIG. 1A, or equivalently neutrons from approximately 300 keV to 700 keV. To measure the spectrum of the neutron source, events were selected for which the measured scatter angle was within 20° of the true angle. The results, i.e., count spectrum, are shown in FIG. 3.

Figure 5:
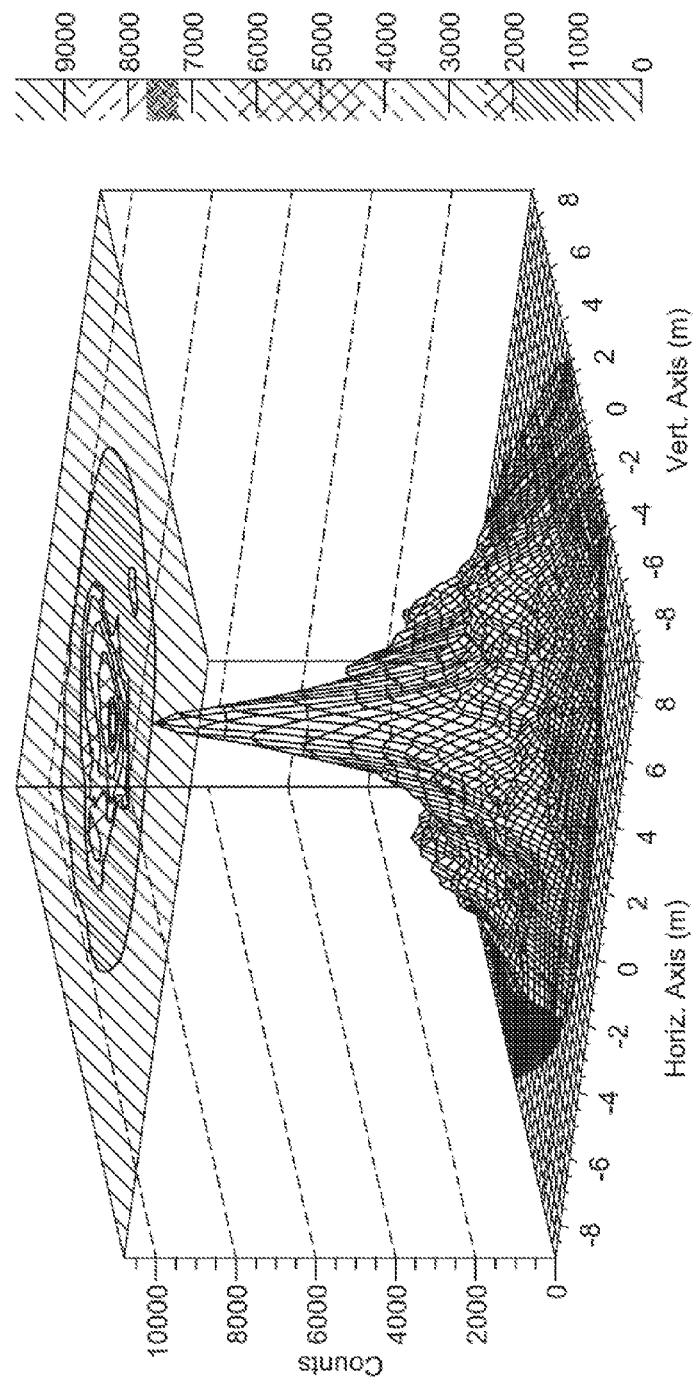
FIG. 5 is a graph of 1st order imaging of a $^{252}$Cf source at 3 meters.

Lastly, the imaging capability can now be examined with many different cell geometries with correspondingly different event cone axes, allowing event circles to intersect. The 3-D plot of the circle intersection density is shown in FIG. 5. No ARM cuts were applied to construct this plot. ARM cuts are only applied to construct the energy spectrum once the source position is known. A strong central peak in FIG. 5 is present in the image plate corresponding to true location of the source. However, there is considerable structure outside the central peak. This structure arises from the correlated circle intersections from the presence of a point source. They are most apparent when the number of cell pairs is small. With a fully populated instrument, the cell pair count grows and these lobes or ghost images will disperse, while the central peak grows in proportion to the effective area, i.e., proportional to the number of cell pairs.

This system or instrument is particularly useful in mixed radiation environments, but typically neutron environments that are also rich in gamma rays. The motivating application is for security use, either by the DoD or DHS or any number of agencies responsible for identifying fissile or radioactive material. One example is a state police force responsible for monitoring or screening traffic in and out of a major city. However, the nuclear power industry could also find a dual species instrument useful for monitoring nuclear fuel and any associated gamma-ray emission.

The DHS use envisioned is one where a neutron emitting quantity of material is cloaked in other materials. A dual species camera can not only identify the source of the neutron emission but also identify the gamma-ray emission induced by the presence of neutrons. The gamma-ray emission carries with it signatures of the material cloaking the neutron source, e.g., plutonium. The most exciting example is that the neutron emission excites nitrogen nuclei in surrounding high explosives (rich in nitrogen). The neutrons may not be seen directly, but the characteristic signatures of nitrogen excitation can still be detected. Any agent could have additional information, not only of the neutron source but also of the surrounding material.

It is also recognized that a first plate with stilbene detectors or other detectors that possess PSD properties could be used with a second plate having both plastic and inorganic detectors. The detectors in the first plate would then provide PSD for both neutron and gamma detection.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. A system for imaging and measuring neutrons and gamma rays, the system comprising:
    a first plurality of solid scintillation detectors distributed over a first plate and configured to detect at least one of a neutron and a gamma ray;
    a second plurality of solid scintillation detectors distributed over a second plate and configured to detect the at least one of a neutron and a gamma ray;
    a third plurality of solid scintillation detectors distributed over the second plate and configured to detect the at least one of a neutron and a gamma ray; and
    an electronic and processing unit electronically connected to the first plurality of solid scintillation detectors, the second plurality of solid scintillation detectors, and the third plurality of solid scintillation detectors and configured to determine a path of the at least one of a neutron and a gamma ray based on an interaction of the at least one of a neutron and a gamma ray with:
        one of the first plurality of solid scintillation detectors; and
        one of either the second plurality of solid scintillation detectors or the third plurality of solid scintillation detectors;
    wherein the first plurality of solid scintillation detectors, the second plurality of solid scintillation detectors, and the third plurality of solid scintillation detectors differ from one another in material composition.

2. The system of claim 1, wherein:
    the first plurality of solid scintillation detectors comprises a plastic that does not have a pulse-shape-discrimination (PSD) property;
    the second plurality of solid scintillation detectors comprises at least one of stilbene and p-Terphenyl and has a PSD property; and
    the third plurality of solid scintillation detectors comprises at least one of sodium iodide, bismuth germanate, cerium-doped lutetium-yttrium oxyorthosilicate, gadolinium-yttrium oxyorthosilicate, cerium-doped yttrium aluminum garnet, and lanthanum bromide.

3. The system of claim 1, wherein:
    the first plurality of solid scintillation detectors comprises at least one of stilbene and p-Terphenyl and has a pulse-shape-discrimination (PSD) property;
    the second plurality of solid scintillation detectors comprises a plastic that does not have a PSD property; and
    the third plurality of solid scintillation detectors comprises at least one of sodium iodide, bismuth germanate, cerium-doped lutetium-yttrium oxyorthosilicate, gadolinium-yttrium oxyorthosilicate, cerium-doped yttrium aluminum garnet, and lanthanum bromide.

4. The system of claim 1, wherein:
    the system is portable; and
    the first plurality of solid scintillation detectors, the second plurality of solid scintillation detectors, and the third plurality of solid scintillation detectors each comprise 1 inch cylindrical scintillation detector cells.

5. The system of claim 1, wherein:
    the first plurality of solid scintillation detectors comprises:
        at least one solid scintillation detector comprising a plastic that does not have a pulse-shape-discrimination (PSD) property;
        at least one solid scintillation detector comprising at least one of stilbene and p-Terphenyl and having a PSD property; and
        at least one solid scintillation detector comprising at least one of sodium iodide, bismuth germanate, cerium-doped lutetium-yttrium oxyorthosilicate, gadolinium-yttrium oxyorthosilicate, cerium-doped yttrium aluminum garnet, and lanthanum bromide; and
    the second plurality of solid scintillation detectors and the third plurality of solid scintillation detectors comprise:
        at least one solid scintillation detector comprising a plastic that does not have a PSD property;
        at least one solid scintillation detector comprising at least one of stilbene and p-Terphenyl and having a PSD property; and
        at least one solid scintillation detector comprising at least one of sodium iodide, bismuth germanate, cerium-doped lutetium-yttrium oxyorthosilicate, gadolinium-yttrium oxyorthosilicate, cerium-doped yttrium aluminum garnet, and lanthanum bromide.

6. A method of imaging and measuring neutrons and gamma rays, the method comprising:
    detecting interaction of a particle with a first solid scintillation detector of a first plurality of solid scintillation detectors distributed over a first plate;
    detecting interaction of the particle with a second solid scintillation detector of either a second plurality of solid scintillation detectors or a third plurality of solid scintillation detectors distributed over the second plate, wherein the first plurality of solid scintillation detectors, the second plurality of solid scintillation detectors, and the third plurality of solid scintillation detectors differ from one another in material composition;
    determining at least one of:
        a time of flight of the particle from the first solid scintillation detector to the second solid scintillation detector; and
        a pulse shape associated with the particle; and
    determining whether the particle is either a neutron or a gamma ray by analyzing at least one of:
        the time of flight of the particle; and
        the pulse shape associated with the particle.

7. The method of claim 6, wherein:
    the first plurality of solid scintillation detectors comprises a plastic that does not have a pulse-shape-discrimination (PSD) property;
    the second plurality of solid scintillation detectors comprises at least one of stilbene and p-Terphenyl and has a PSD property; and the third plurality of solid scintillation detectors comprises at least one of sodium iodide, bismuth germanate, cerium-doped lutetium-yttrium oxyorthosilicate, gadolinium-yttrium oxyorthosilicate, cerium-doped yttrium aluminum garnet, and lanthanum bromide.

8. The method of claim 6, wherein:
the first plurality of solid scintillation detectors comprises at least one of stilbene and p-Terphenyl and has a pulse-shape-discrimination (PSD) property;
the second plurality of solid scintillation detectors comprises a plastic that does not have a PSD property; and
the third plurality of solid scintillation detectors comprises at least one of sodium iodide, bismuth germanate, cerium-doped lutetium-yttrium oxyorthosilicate, gadolinium-yttrium oxyorthosilicate, cerium-doped yttrium aluminum garnet, and lanthanum bromide.

9. The method of claim 6 further comprising utilizing the pulse shape associated with the particle to maximize signal-to-noise ratio in determining whether the particle is a neutron or a gamma ray.

10. The method of claim 6, wherein:
the system is portable; and
the first plurality of solid scintillation detectors, the second plurality of solid scintillation detectors, and the third plurality of solid scintillation detectors each comprise 1 inch cylindrical scintillation detector cells.

11. The method of claim 6, wherein:
the first plurality of solid scintillation detectors comprises:
at least one solid scintillation detector comprising a plastic that does not have a pulse-shape-discrimination (PSD) property;
at least one solid scintillation detector comprising at least one of stilbene and p-Terphenyl and having a PSD property; and
at least one solid scintillation detector comprising at least one of sodium iodide, bismuth germanate, cerium-doped lutetium-yttrium oxyorthosilicate, gadolinium-yttrium oxyorthosilicate, cerium-doped yttrium aluminum garnet, and lanthanum bromide; and
the second plurality of solid scintillation detectors and the third plurality of solid scintillation detectors comprise:
at least one solid scintillation detector comprising a plastic that does not have a PSD property;
at least one solid scintillation detector comprising at least one of stilbene and p-Terphenyl and having a PSD property; and
at least one solid scintillation detector comprising at least one of sodium iodide, bismuth germanate, cerium-doped lutetium-yttrium oxyorthosilicate, gadolinium-yttrium oxyorthosilicate, cerium-doped yttrium aluminum garnet, and lanthanum bromide.

12. A system for imaging and measuring neutrons and gamma rays, the system comprising:
a plurality of solid scintillation detector rods radially distributed about a central axis and comprising:
a first solid scintillation detector rod configured to detect at least one of a neutron and a gamma ray;
a second solid scintillation detector rod configured to detect the at least one of a neutron and a gamma ray; and
a third solid scintillation detector rod configured to detect the at least one of a neutron and a gamma ray; and
an electronic and processing unit electronically connected to the plurality of solid scintillation detector rods and configured to determine a path of the at least one of a neutron and a gamma ray based on an interaction of the at least one of a neutron and a gamma ray with:
the first solid scintillation detector rod; and
either the second solid scintillation detector rod or the third solid scintillation detector rod;
wherein the first solid scintillation detector rod, the second solid scintillation detector rod, and the third solid scintillation detector rod differ from one another in material composition.

13. The system of claim 12, wherein:
one of the first scintillation detector rod, the second scintillation detector rod, and the third scintillation detector rod comprises a plastic that does not have a pulse-shape-discrimination (PSD) property;
another of the first scintillation detector rod, the second scintillation detector rod, and the third scintillation detector rod comprises at least one of stilbene and p-Terphenyl and has a PSD property; and
another of the first scintillation detector rod, the second scintillation detector rod, and the third scintillation detector rod comprises at least one of sodium iodide, bismuth germanate, cerium-doped lutetium-yttrium oxyorthosilicate, gadolinium-yttrium oxyorthosilicate, cerium-doped yttrium aluminum garnet, and lanthanum bromide.

14. The system of claim 12, wherein:
the first scintillation detector rod is disposed immediately adjacent the second scintillation detector rod;
the second scintillation detector rod is disposed immediately adjacent the third scintillation detector rod; and
the first scintillation detector rod, the second scintillation detector rod, and the third scintillation detector rod, together, constitute a trio grouping that is repeated at least once in the radial distribution of the plurality of scintillation detector rods about the central axis.

15. The system of claim 12, wherein the plurality of scintillation detector rods are of uniform length and are each cylindrical in geometry and of uniform diameter.

16. A method of imaging and measuring neutrons and gamma rays, the method comprising:
detecting interaction of a particle with a first solid scintillation detector rod of a plurality of solid scintillation detector rods radially distributed about a central axis;
detecting interaction of the particle with either a second solid scintillation detector rod or a third solid scintillation detector rod of the plurality of solid scintillation detector rods, wherein the first solid scintillation detector rod, the second solid scintillation detector rod, and the third solid scintillation detector rod differ from one another in material composition;
determining at least one of:
a time of flight of the particle from the first solid scintillation detector rod to either the second solid scintillation detector rod or the third solid scintillation detector rod; and
a pulse shape associated with the particle; and
determining whether the particle is either a neutron or a gamma ray by analyzing at least one of:
the time of flight of the particle; and
the pulse shape associated with the particle.

17. The method of claim 16, wherein:
one of the first scintillation detector rod, the second scintillation detector rod, and the third scintillation detector rod comprises a plastic that does not have a pulse-shape-discrimination (PSD) property;
another of the first scintillation detector rod, the second scintillation detector rod, and the third scintillation detector rod comprises at least one of stilbene and p-Terphenyl and has a PSD property; and another of the first scintillation detector rod, the second scintillation detector rod, and the third scintillation detector rod comprises at least one of sodium iodide, bismuth germanate, cerium-doped lutetium-yttrium oxyorthosilicate, gadolinium-yttrium oxyorthosilicate, cerium-doped yttrium aluminum garnet, and lanthanum bromide.

18. The method of claim 16, wherein:

the first scintillation detector rod is disposed immediately adjacent the second scintillation detector rod;

the second scintillation detector rod is disposed immediately adjacent the third scintillation detector rod; and the first scintillation detector rod, the second scintillation detector rod, and the third scintillation detector rod, together, constitute a trio grouping that is repeated at least once in the radial distribution of the plurality of scintillation detector rods about the central axis.

19. The method of claim 16, wherein the plurality of scintillation detector rods are of uniform length and are each cylindrical in geometry and of uniform diameter.

20. The method of claim 16 further comprising utilizing the pulse shape associated with the particle to maximize signal-to-noise ratio in determining whether the particle is a neutron or a gamma ray.

* * * * *